Oct. 23, 1945.         B. GEHMLICH         2,387,574
PHOTOGRAPHIC SHUTTER
Filed Nov. 16, 1940

Inventor:
Bruno Gehmlich
BY:-
Singer, Ehlert, Stern & Carlberg
Attys.

Patented Oct. 23, 1945

2,387,574

UNITED STATES PATENT OFFICE 2,387,574

PHOTOGRAPHIC SHUTTER

Bruno Gehmlich, Freital 1, near Dresden, Germany; vested in the Alien Property Custodian Application November 16, 1940, Serial No. 365,903
In Germany November 28, 1939

6 Claims. (Cl. 161—26)

The invention relates to improvements in photographic shutters and particularly is directed to curtain shutters, also known as focal plane shutters.

It is an object of the invention to provide a photographic curtain shutter with a delayed action release which is released by an element of the curtain shutter when the latter starts its movement to expose the film.

Another object of the invention is to provide the roller on which the curtain tape is wound during the tensioning of the shutter with a cam-like member which when the shutter is released and starts its exposure movement engages a control lever associated with the delayed action release and thereby causes the control lever to release the delayed action release. The control lever prevents a further motion of the shutter until the delayed action release has run off whereupon the curtain resumes its movement and exposes the film.

Figure 1:
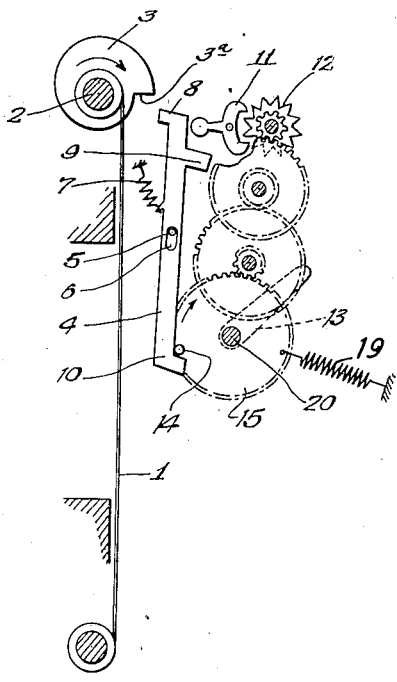
Fig. 1 illustrates diagrammatically a curtain shutter provided with a delayed action release, the latter being shown in an untensioned position.

In the drawing, the curtain shutter 1 is provided with a cam 3 on the conventional roller 2 which takes up the curtain tape during the tensioning of the shutter. A control lever 4 on one hand is adapted to stop under certain conditions, as will be explained presently, the rotation of the roller 2 and on the other hand is adapted to lock the anchor-escapement of the delayed action release against operation. The control lever 4 is slidably and pivotally supported by means of a fixedly mounted pin 5, which traverses a slot 6 in the lever 4 between the ends thereof. A spring 7 normally urges the control lever 4 upwardly toward the cam 3. The control lever 4 is provided with three lateral projections 8, 9 and 10 as shown. The delayed action release is provided with an anchor-escapement comprising the oscillatable anchor or pallet 11 and the toothed wheel 12. A lever 13, which is usually mounted on the outside of the camera casing, is adapted to be manually rotated in one direction to tension the delayed action release. The lever 13 is attached to a shaft 20 on which a gear 15 is mounted. A pin 14 on one side of the gear 15 is adapted to engage the lateral projection 10 at the lower end of the control lever 4 and thus limits the unwinding movement of the delay action release. A spring 19 normally has the tendency to rotate the gear 15 in anticlockwise direction until pin 14 engages in the untensioned position (Fig. 1) of the delayed action release the lateral projection 10 of the lever 4.

Figure 2:
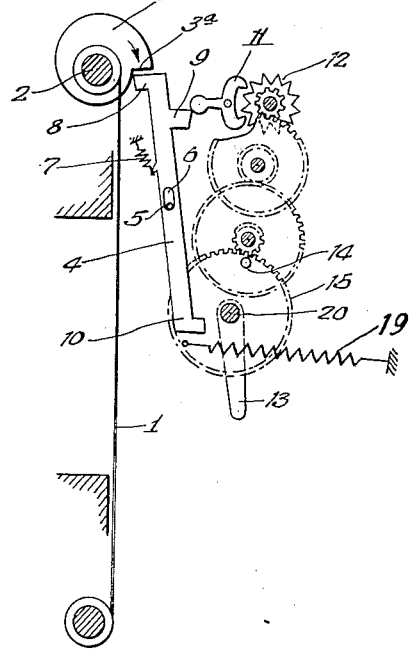
Fig. 2 illustrates the curtain shutter with the delayed action release in a tensioned position.

The delayed action release is tensioned by manually rotating the lever 13 in clockwise direction. When the pin 14 is thus moved away from the lateral projection 10 of the control lever 4, the spring 7 pulls the entire control lever 4 substantially lengthwise upwardly until the lower end of the slot 6 rests against the supporting pin 5. In this position of the control lever 4, as illustrated in Fig. 2, its lateral projection 9 engages the anchor 11 of the escapement and holds it in a position to prevent an unwinding of the tensioned delayed action release. At the same time the lateral projection 8 at the uppermost end of the control lever 4 comes to lie under the shoulder 3ª of the cam 3, provided the curtain shutter is in a tensioned position. In this position of the parts, as illustrated in Fig. 2, a continuous unwinding movement of the shutter to expose the film in the focal plane of the camera cannot take place until the delayed action release has previously been run off.

Figure 3:
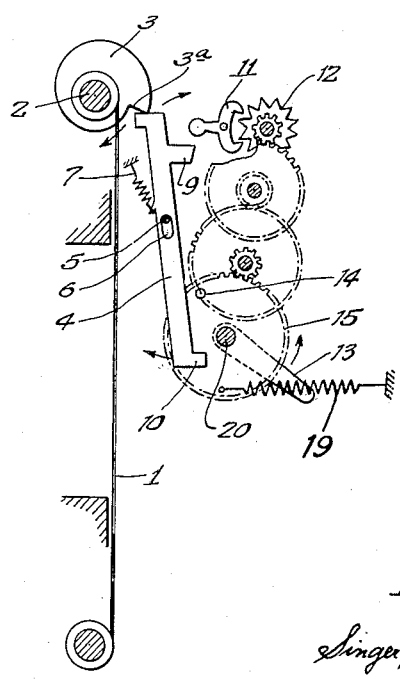
Fig. 3 illustrates the curtain shutter with the delayed action release during the unwinding movement.

When unwinding of the shutter is initiated by depressing the conventional shutter release knob, the roller 2 starts to rotate in clockwise direction and the shoulder 3ª of the cam 3 pushes the control lever 4 lengthwise downwardly a distance limited by the upper end of the slot 6. During this movement of the control lever 4, as illustrated in Fig. 3, the lateral projection 9 is moved away from the anchor 11 and the latter is free to oscillate back and forth so as to control in well known manner the unwinding of the delayed action release. During this unwinding movement the pin 14 on the gear 15 engages the lower end of the control lever 4 and rotates the same about its piovt 5 in clockwise direction. This has the result that the lateral projection 8 of the control lever 4 is moved away from the shoulder 3ª of the cam 3 and as soon as the cam 3 is thus released the shutter continues and completes its exposure movement and exposes the film in the focal plane of the camera. The unwinding movement of the delayed action release is completed when the pin 14 on the gear 15 engages the lateral projection 10 of control lever as shown in Fig. 1.

The cam 3 is so arranged on the roller 2 that in the unwound or released position of the shutter the highest point of the cam 3 projects into the path of lateral extension 8 of the control lever 4. Under this condition, the control lever 4 cannot lock the anchor 11 of the escapement against movement when the delayed action release is tensioned without a prior tensioning of the shutter and the delayed action release would immediately begin its unwinding movement as soon as the operator releases the manually operable tensioning lever 13.

What I claim is:

1. The combination of a photographic curtain shutter including a roller for taking up the curtain during the tensioning of the shutter, a delayed action release including an escapement, means actuated by said roller for releasing the escapement of said previously tensioned delayed action release shortly after the curtain shutter upon its release has been set in motion to execute its exposure movement, said means arresting the motion of said shutter until said delayed action release has run off, and means actuated by said delayed action release at the end of its unwinding movement to adjust said first named means to permit a continued motion of said shutter during which the exposure takes place.

2. The combination of a photographic curtain shutter provided with a roller on which the curtain is wound during the tensioning of the shutter, a delayed action release including an escapement, a slidably and pivotally mounted lever actuated by said roller for releasing the escapement of said previously tensioned delayed action release shortly after the curtain upon its release has been set in motion to perform its exposure movement, said lever arresting the motion of said curtain until said delayed action release has run off, and means actuated by said delayed action release at the end of its unwinding movement to adjust said lever to cause said curtain to continue and finish its exposure movement.

3. The combination of a photographic curtain shutter provided with a roller on which the curtain is wound during the tensioning of the shutter, a cam on said roller, a delayed action release including an escapement, and a slidably pivotally mounted lever actuated by said cam for releasing the escapement of said previously tensioned delayed action release shortly after the curtain upon its release has been set in motion to perform its exposure movement, said lever arresting the motion of said curtain until said delayed action release has run off, and means actuated by said delayed action release at the end of its unwinding movement for operating said lever to cause said curtain to continue and finish its exposure movement.

4. The combination of a photographic curtain shutter provided with a roller on which the curtain is wound during the tensioning of the shutter, a delayed action release including an anchor-escapement, a slidably and rotatably mounted lever, a spring for urging said lever in engagement with the anchor of said anchor-escapement when said delayed action release is tensioned to prevent an unwinding of the delayed action release until the previously tensioned shutter is set in motion, means on said roller actuating said lever to release said anchor-escapement shortly after said shutter upon its release has been set in motion, said lever being maintained in a position in which it prevents a further motion of the shutter until said delayed action release has run off, and means actuated by said delayed action release at the end of its unwinding movement for moving said lever into a position in which it permits said shutter to continue and finish its exposure movement.

5. The combination of a photographic curtain shutter provided with a roller on which the curtain is wound during the tensioning of the shutter, a delayed action release including an anchor-escapement, a slidably and rotatably mounted lever, a spring for urging said lever in engagement with the anchor of said anchor-escapement when said delayed action release is tensioned to prevent an unwinding of the delayed action release until the previously tensioned shutter is set in motion, means on said roller slidably moving said lever to release said anchor-escapement shortly after said shutter upon its release has been set in motion, said lever being maintained in a position in which it prevents a further motion of the shutter until said delayed action release has run off, and means on said delayed action release for rotating said lever at the end of its unwinding movement into a position in which said lever permits said shutter to continue and finish its exposure movement.

6. The combination of a photographic curtain shutter provided with a roller on which the curtain is wound during the tensioning of the shutter, a delayed action release including an anchor-escapement and a manually operable winding member, a slidably and rotatably mounted lever, a spring for urging said lever in engagement with the anchor of said anchor-escapement when said delayed action release is tensioned to prevent an unwinding of the delayed action release until the previously tensioned shutter is set in motion, means on said roller actuating said lever to release said anchor-escapement shortly after said shutter upon its release has been set in motion, said lever being maintained in a position in which it prevents a further motion of the shutter until said delayed action release has run off, and means on said winding member which at the end of its unwinding movement moves said lever into a position in which it permits said shutter to continue and finish its exposure movement.

BRUNO GEHMLICH.